United States Patent Office 3,536,737
Patented Oct. 27, 1970

3,536,737
PROCESS FOR PREPARING CARBOXYLIC ACID THIOANHYDRIDES
Silvio L. Giolito, Whitestone, and Melvin M. Schlechter, New Hyde Park, N.Y., assignors to Stauffer Chemical Company, New York, N.Y., a corporation of Delaware
No Drawing. Filed Jan. 19, 1968, Ser. No. 699,034
Int. Cl. C07c 153/01
U.S. Cl. 260—399
8 Claims

ABSTRACT OF THE DISCLOSURE

A process for preparing carboxylic acid thioanhydrides of the formula:

(1) 

wherein the groups represented by R are aliphatic radicals of from 4 to 30 carbon atoms. The process comprises reacting at least one aliphatic acid halide of the formula:

(2) 

with an aliphatic thio of the formula:

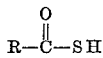

wherein the groups represented by R are as previously defined and X is a halogen in the presence of an inert solvent.

---

This invention relates to organic acid thioanhydrides and more particularly to a process for prepairng aliphatic carboxylic acid thioanhydrides by the reaction of aliphatic acid halides with aliphatic thio acids in the presence of an inert gas.

Organic thioanhydrides are known. For example, a process for preparing thioanhydrides of aromatic carboxylic acids is disclosed in Blake, U.S. Pat. No. 2,331,650, issued Oct. 12, 1943. The thioanhydrides of aliphatic carboxylic acids have not been extensively investigated except as to the lowest member of the series, thioacetyl anhydride. For example, Bonner JACS 72, 4270 (1950) prepared thioacetyl anhydride by refluxing thiolacetic acid and acetyl chloride. While this process is a useful laboratory procedure, it does not lend itself to large scale commercial production by reason of the highly corrosive hydrogen chloride by-product.

It has now been discovered that the fatty carboxylic acid thioanhydrides can be prepared in good yield by reacting an aliphatic acid halide with an aliphatic thioacid in the presence of an inert gas. In accordance with this invention, the hydrogen halide by-product is removed from the reaction mixture by the inert gas as it is formed so that there is no decomposition of the thioanhydride product or damage to the process apparatus. In a preferred embodiment a solvent is employed in order to provide more intimate mixture, but none is required.

The reaction can be illustrated by the following diagram wherein the groups represented by R are aliphatic hydrocarbon radicals of from 4 to 26 carbon atoms which can be the same or different and X is a halogen.

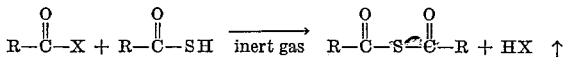 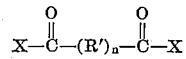

The aliphatic hydrocarbon radicals represented by R can be saturated or unsaturated and can be substituted with any relatively inert radical. Examples of suitable saturated radicals include: butyl, pentyl, hexyl, heptyl, octyl, nonyl, decyl, undecyl, dodecyl, tridecyl, tetradecyl, pentadecyl, hexadecyl, heptadecyl, octadecyl, nondecyl, eicosyl and heneicosyl. Examples of suitable unsaturated radicals include: ethenyl, propenyl, butenyl, pentenyl, hexenyl, heptenyl, octenyl, nonenyl, decenyl, hexadecenyl and eicosenyl. Examples of relatively inert radicals include halogens such as fluorine, chlorine and bromine, as well as nitro groups.

Solvents which can be employed include the lower saturated alkanes of from 3 to 20 carbon atoms, halogenated saturated alkanes of from 1 to 10 carbon atoms, and aromatic hydrocarbons of from 6 to 20 carbon atoms. Examples of suitable alkane solvents include propane, butane, pentane, heptane, hexane, nonane, decane and dodecane. Alicyclic hydrocarbons can also be employed such as cyclopropane, cyclobutane, cyclopentane and cyclohexane. Examples of suitable halogenated alkanes which include both chloro- and fluorosubstituted are: ethyl chloride and dichlorodifluoromethane. Examples of suitable aromatic hydrocarbons include benzene, toluene, xylene, mesitylene, ethyl benzene and ethyl toluene.

By this invention, the hydrogen halide by-product is removed by introducing an inert gas into the refluxing reaction mixture in order to remove the hydrogen halide gaseous by-product as it is formed. By this method the reaction is driven to completion without any decomposition of the thioanhydride product. Moreover, the product is produced in yields in excess of 90%. Examples of inert gases which can be employed are those which are normally gaseous and include nitrogen, carbon monoxide, carbon dioxide, neon, argon, xenon and the lower alkanes such as methane, ethane, propane and butane or natural gas.

Acid halides which can be employed in the invention process are the chlorides, bromides and fluorides of substituted and unsubstituted medium chain aliphatic carboxylic acids having from 5 to 27 carbon atoms. For economic reasons the chlorides are, of course, preferred. Representative examples include: isovaleroyl chloride, caproyl chloride, neo-heptanoyl chloride, n-heptanoyl chloride, pelargonic acid chloride, undecylenic acid chloride, ω-bromo-undecanoyl chloride, 2-nitro-hexanoyl chloride, lauroyl chloride, palmitoyl chloride, cyclohexyl carboxylic acid chloride, stearoyl chloride, tetrachlorostearoyl chloride, α-chlorostearoyl chloride, α-thioethylstearoyl chloride, oleoyl chloride, 9,10-dibromostearoyl chloride, behenic acid chloride. Also mixtures of aliphatic acid chlorides and mixtures of substituted acid chlorides can be used such as are obtained from natural fats and oils, e.g., coconut acid chlorides and tallow acid chlorides. The hydrocarbon moieties R and R can be substituted with any relatively inert radical such as fluorine, chlorine, bromine, and nitro groups. Acetylenic unsaturated carboxylic acid halides can also be employed in the process of the invention, such as, for example, the chlorides of amylpropiolic acid, palmitolic acid, stearolic acid and behenolic acid. The hydrocarbon radicals can also contain ether or thioether linkages.

Dicarboxylic acid halides can also be employed. They can be represented by the formula:

$$X-\overset{O}{\underset{\|}{C}}-(R')_n-\overset{O}{\underset{\|}{C}}-X$$

wherein X is as previously defined, R' is a divalent radical of from 1 to 12 carbon atoms, and n is an integer of from 0 to 1. Both saturated and unsaturated acid halides can be employed. Examples of suitable saturated compounds include the acid halides of: oxalic, malonic, succinic, glutaric, adipic, pimelic, suberic, azelaic, sebacic, and brassic. Examples of suitable unsaturated compounds include the acid halides of fumaric, maleic, glutaconic, allylmalonic, tetraconic and xeronic. Mixtures of both saturated and unsaturated mono and dicarboxylic acid halides can be employed if desired. While the dicarboxylic acid thioanhydrides have many uses, they are particularly useful as polyvinyl chloride and rubber stabilizers.

Thio acids which can be employed are the substituted and unsubstituted medium chain aliphatic carboxylic thio acids having from 5 to 31 carbon atoms. Exemplary of the thio acids are the unsubstituted and substituted hydrocarbon moieties enumerated in the previous two paragraphs.

The reaction can be conveniently conducted batchwise or continuously at atmospheric pressure at a temperature between about 25° C. and 150° C. A preferred temperature range is between from about 35° C. and about 100° C. Reaction temperatures are not, however, a critical aspect of the invention.

Generally the reactants are present in stoichiometric amounts, although a slight excess of ether reactant is not detrimental. The quantity of solvent should be sufficient to contain the reactants in solution so as to provide intimate contact. When the reactant is complete as evidenced by no further hydrogen halide evolution, the product can be recovered by the conventional means such as filtration and can be further purified, if desired, by crystallization, distillation and the like.

The following examples will serve to illustrate the process of the invention and its preferred embodiments.

EXAMPLE 1

Preparation of thiostearic anhydride

To a 1 liter 3-necked reaction flask fitted with a gas dispersion tube, agitator, thermometer and water cooled reflux condenser were added 104 grams (0.312 mol) of thiostearic acid dissolved in 250 milliliters of benzene. To this mixture was then added 94.4 grams (0.312 mol) of stearoyl chloride with agitation. The temperature of the exothermic reaction rose to 35° C. Nitrogen gas was introduced by way of the gas dispersion tube and the mixture was brought to reflux temperature and maintained at this temperature for four hours until the evolution of hydrogen chloride terminated. The reaction mixture was allowed to cool to 25° C., filtered and the precipitate washed with benzene. The precipitate was washed a second time with acetone, filtered and air dried to produce 163 grams of thiostearic anhydride having a melting point of 75° C. the structure was further confirmed by instrumental analysis (yield equal to 92.5%).

EXAMPLE 2

Preparation of thiolauric anhydride

In accordance with the procedure of Example 1, thiolauric anhydride is prepared from thiolauric acid and lauryl chloride.

EXAMPLE 3

Preparation of thiocaprylic anhydride

In accordance with the procedure of Example 1, thiocaprylic anhydride is prepared from thiocaprylic acid and caproyl chloride.

The aliphatic carboxylic acid thioanhydrides can be employed to protect a number of polymers against degradation and discoloration due to heating. They are particularly effective in stabilizing the halogen containing hydrocarbon polymers such as polyvinyl chloride, and polyvinylidene chloride. The presence of between about 0.01% and about 10% by weight of the stabilizer compound will be sufficient for most applications, although the preferable range is between about 1% and about 5% on a weight basis.

What is claimed is:

1. A process for preparing aliphatic carboxylic acid thioanhydrides of the formula:

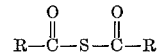

wherein the groups represented by R are aliphatic radicals of from 4 to 30 carbon atoms, which comprises reacting an aliphatic acid halide of the formula:

with an aliphatic thioacid of the formula:

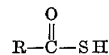

wherein the groups represented by R are as previously defined in the presence of an inert gas selected from the group consisting of nitrogen, carbon monoxide, carbon dioxide, neon, argon, xenon, methane, ethane, propane, butane or natural gas where the inert gas is passed through the reaction mixture at a rate sufficient to remove the hydrogen halide by-product.

2. The process of claim 1, wherein the reaction is conducted in the presence of a solvent.

3. The process of claim 1, wherein the temperature of the reaction is maintained between about 25° C. and about 150° C.

4. The process of claim 1, wherein the thioacid is thiostearic acid and the acid halide is stearoyl chloride.

5. The process of claim 1 wherein the thioacid is thiolauric acid and the acid halide is lauroyl chloride.

6. The process of claim 1, wherein the thioacid is thiocaprylic acid and the acid halide is lauroyl chloride.

7. The process of claim 1, wherein the temperature of the reaction is maintained between about 35° C. and about 100° C.

8. The process of claim 1, wherein the inert gas is nitrogen.

References Cited

UNITED STATES PATENTS 2,726,142  12/1955  Reeve _____ 23—154
2,854,325  9/1958  Searle _____ 260—545

OTHER REFERENCES

Arndt et al., Chemical Abstracts 25, 914–915 (1931).

DANIEL D. HORWITZ, Primary Examiner

U.S. Cl. X.R.

260—545, 45.7